(12) United States Patent
Oates et al.

(10) Patent No.: US 9,755,432 B2
(45) Date of Patent: Sep. 5, 2017

(54) ALTERNATE ARM CONVERTER

(71) Applicant: ALSTOM TECHNOLOGY LTD, Baden (CH)

(72) Inventors: Colin Donald Murray Oates, Staffordshire (GB); David Reginald Trainer, Derby (GB); Ralph Feldman, Nottingham (GB); Michael Marc Claude Merlin, Dourdan (GB); Timothy Charles Green, Haywards Heath (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 14/896,907

(22) PCT Filed: Jun. 6, 2014

(86) PCT No.: PCT/EP2014/061916
§ 371 (c)(1),
(2) Date: Dec. 8, 2015

(87) PCT Pub. No.: WO2014/198674
PCT Pub. Date: Dec. 18, 2014

(65) Prior Publication Data
US 2016/0141876 A1 May 19, 2016

(30) Foreign Application Priority Data

Jun. 10, 2013 (EP) .................................... 13171312

(51) Int. Cl.
*H02J 3/18* (2006.01)
*H02M 7/483* (2007.01)
(Continued)

(52) U.S. Cl.
CPC ............... *H02J 3/18* (2013.01); *H02M 7/483* (2013.01); *H02J 3/36* (2013.01); *H02M 7/49* (2013.01);
(Continued)

(58) Field of Classification Search
CPC ............ H02M 7/42; H02M 7/44; H02M 7/48; H02M 7/483; H02M 7/487; H02M 7/49;
(Continued)

(56) References Cited

U.S. PATENT DOCUMENTS 7,960,871 B2 6/2011 Dommaschk et al.
8,848,401 B2 9/2014 Green et al.
(Continued)

FOREIGN PATENT DOCUMENTS

WO WO-2010/145690 A1 6/2010
WO WO-2010/149200 A1 12/2010
(Continued)

OTHER PUBLICATIONS

International Search Report and Written Opinion, PCT/EP2014/061916, Alstom Technology Ltd, 12 pages (Sep. 3, 2014).
(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

An alternate arm converter includes at least one converter limb that defines first and second limb portions. Each limb portion includes at least one director switch connected in series with a chain-link converter between one of two DC terminals and an AC terminal of the converter. The chain-link converters are operable to generate a voltage waveform at the AC terminal, and the director switches are operable to switch the respective chain-link converters in and out of
(Continued)

circuit between the respective DC terminal and the AC terminal. The converter also includes a controller configured to selectively control the switching of each director switch to form a current circulation path including each limb portion and the DC network. The controller, during formation of the current circulation path, forces an alternating current to flow through the current circulation path to transfer energy between the chain-link converters of the limb portions.

9 Claims, 10 Drawing Sheets

(51) Int. Cl.
*H02J 3/36* (2006.01)
*H02M 7/49* (2007.01)
*H02M 1/00* (2006.01)

(52) U.S. Cl.
CPC ............ *H02M 2001/0003* (2013.01); *H02M 2007/4835* (2013.01)

(58) Field of Classification Search
CPC .. H02M 7/537; H02M 7/5387; H02M 7/5388; H02M 7/797; H02M 2007/4835; H02M 2001/0003; H02J 3/18; H02J 3/36
See application file for complete search history.

(56) References Cited

U.S. PATENT DOCUMENTS

| | | | |
|---|---|---|---|
| 2010/0145690 A1 | 6/2010 | Watanabe | |
| 2012/0113699 A1* | 5/2012 | Crookes | H02M 7/483 363/126 |
| 2013/0094264 A1* | 4/2013 | Crookes | H02J 3/1835 363/127 |
| 2013/0279211 A1* | 10/2013 | Green | H02M 7/49 363/35 |
| 2014/0133196 A1* | 5/2014 | Trainer | H02J 3/18 363/35 |

FOREIGN PATENT DOCUMENTS

| | | |
|---|---|---|
| WO | WO 2012/055435 A1 | 5/2012 |
| WO | WO 2013/000510 A1 | 1/2013 |

OTHER PUBLICATIONS

Antonopoulos, Antonios et al., "On dynamics and voltage control of the modular multilevel converter," 13$^{th}$ European Conference on Power Electronics and Applications, retrieved from http://ieeexplore.ieee.org/stamp/stamp.jsp?arnumber=5278794 (Sep. 8, 2009).

Cross, A. et al., "Chain-link based HVDC voltage source converter using current injection," ACDC 9th IET International Conference, 5 pages (Oct. 2010).

Davidson, C. et al., "Innovative concepts for hybrid multi-level converters for HVDC power transmission," ACDC 9th IET International Conference, pp. 1-5 (Oct. 2010).

Feldman, R. et al., "DC Fault ride-through capability and statcom operation of a hybrid voltage source converter arrangement for HVDC power transmission and reactive power compensation," Power Electronics, Machines and Drives (PEMD), 6th IET International Conference, 5 pages (2012).

Merlin, M. et al., "A new hybrid multi-level voltage-source converter with DC fault blocking capability," ACDC 9th IET International Conference, 5 pages (Oct. 2010).

Merlin, M., "Alternate Arm Converter: a new hybrid multi-level converter with DC-fault blocking capability," IEEE Transaction on Power Delivery, pp. 1-8 (Oct. 7, 2013).

Merlin, M., "Hybrid multi-level HVDC converter and multi-terminal DC networks," Ph.D Thesis, Imperial College London, Department of Electrical and Electronic Engineering (Apr. 2014).

Munch, P. et al., "Integrated current control energy control and energy balancing on modular multi-level converters," 36th Annual Conference on IEEE Industrial Electronics Society, pp. 150-155 (2010).

Trainer, D.R. et al., "A new hybrid voltage-sourced converter for HVDC power transmission," CIGRE, 12 pages (2010).

* cited by examiner

Prior Art

ALTERNATE ARM CONVERTER

CROSS REFERENCE TO RELATED APPLICATIONS

The present application is a National Stage of International Application No. PCT/EP2014/061916, filed Jun. 6, 2014, which claims priority to European Application No. 13171312, filed Jun. 10, 2013, which is incorporated herein by reference in its entirety.

This invention relates to an alternate arm converter for use in high voltage direct current (DC) power transmission and reactive power compensation, and a method of controlling such an alternate arm converter.

A known type of voltage source converter 10, i.e. a so-called "alternate arm converter" (AAC) 12, is shown schematically in FIG. 1.

Such an AAC 12 typically includes first, second and third converter limbs 14a, 14b, 14c each of which is essentially identical. To this end, each converter limb 14a, 14b, 14c includes a first DC terminal 16a, 16b, 16c and a second DC terminal 18a, 18b, 18c, each of which is in use connected to a direct current (DC) network 20. Each converter limb 14a, 14b, 14c also includes a respective AC terminal 22a, 22b, 22c which in use is connected to a corresponding first, second or third phase 24a, 24b, 24c of an alternating current (AC) network 26.

In addition each converter limb 14a, 14b, 14c defines first and second limb portions 28a, 28b, 28c, 30a, 30b, 30c, each of which extends between a respective one of the first DC terminals 16a, 16b, 16c and a corresponding AC terminal 22a, 22b, 22c, or between a respective one of the second DC terminals 18a, 18b, 18c and the corresponding AC terminal 22a 22b, 22c.

Each limb portion 28a, 28b, 28c, 30a, 30b, 30c, or "arm", includes a single director switch 32 which is connected in series with a chain-link converter 34. In other arrangements (not shown) each limb portion may include a plurality of series-connected director switches.

Each chain-link converter 34 includes a chain of modules 36 connected in series, with each module 36 normally including either:

(i) one pair of switching elements 38 connected in parallel with an energy storage device, e.g. a capacitor 40, in a half-bridge arrangement 42 to form a 2-quadrant unipolar module that can provide zero or positive voltage, and can conduct current in both directions; or (ii) two pairs of switching elements connected in parallel with an energy storage device, e.g. a capacitor 40, in a full-bridge arrangement 44 to form a 4-quadrant bipolar module that can provide zero, positive or negative voltage, and can conduct current in both directions.

In each instance the switching elements 38 are operable so that the corresponding chain of modules 36 is able to provide a stepped variable voltage source and thereby generate a voltage waveform at the corresponding AC terminal 22a 22b, 22c.

In addition the director switch 32 of each limb portion 28a, 28b, 28c, 30a, 30b, 30c is operable to switch the corresponding chain-link converter 34 in and out of circuit between the respective first or second DC terminal 16a, 16b, 16c, 18a, 18b, 18c and the corresponding AC terminal 22a 22b, 22c.

For example, during a first mode of operation, as shown schematically in FIG. 2(a) for a first converter limb 14a, the director switch 32 of the first limb portion 28a is closed (to switch the chain-link converter 34 connected in series therewith into circuit between the first DC terminal 16a and the corresponding AC terminal 22a) and the director switch of the second limb portion 30a is opened (to switch the chain-link converter 34 connected in series therewith out of circuit between the second DC terminal 18a and the corresponding AC terminal 22a).

Meanwhile, during a second mode of operation, as shown schematically in FIG. 2(b), the director switch 32 of the second limb portion 30a is closed (to switch the chain-link converter 34 connected in series therewith into circuit between the second DC terminal 18a and the corresponding AC terminal 22a) and the director switch of the first limb portion 28a is opened (to switch the chain-link converter 34 connected in series therewith out of circuit between the first DC terminal 16a and the corresponding AC terminal 22a).

Such switching of the chain-link converters 34 in and out of circuit during each of the aforementioned modes reduces the voltage range that each chain-link converter 34 is required to generate, and thereby reduces the number of modules 36 needed in each chain-link converter 34 (and hence the size and cost of each chain-link converter 34).

When using such an alternate arm converter 12 to convert AC power to DC power, energy $E^+$, $E^-$ is transferred between the AC network 26 and the DC network 20. Such energy transfer occurs via the various energy storage devices, i.e. capacitors 40, in the modules 36 of each chain-link converter 34 during each of the first and second modes of operation mentioned above.

During normal operation of an alternate arm converter 12 an optimal DC voltage $V_{DC\text{-}opt}$ is generated in the DC network 20 so as to help ensure that the amount of energy $E^+$, $E^-$ transferred from the AC network 26 is equal to the amount of energy $E^+$, $E^-$ transferred to the DC network 20.

One way in which the value of such an optimal DC voltage $V_{Dc\text{-}opt}$ may be determined is as a function of the magnitude of AC voltage arising at the corresponding AC terminal 22a, e.g. (for a three phase AC network):

$$V_{DC\text{-}opt} = \frac{\pi}{\sqrt{6}} V_{AC\text{-}Line\text{-}to\text{-}Line}$$

Transferring an equal amount of energy between the AC and DC networks 26, 20 helps to ensure that the energy stored in the chain-link converter 34 of the first limb portion 28a, 28b, 28c, of a given converter limb 14a, 14b, 14c is substantially equal to the energy stored in the chain-link converter 34 of the corresponding second limb portion 30a, 30b, 30c, e.g. as shown schematically in FIG. 3(a).

However during abnormal operation of the alternate arm converter 12, such as arises during dynamic changes between power and reactive power operating points or when responding to AC and/or DC network faults, the energy transfer between the AC and DC networks 26, 20 is unequal. The difference in energy transferred must be accumulated in (or lost from) the capacitors 40 of the various modules 36 within the chain-link converters 34. As a result the energy stored in the chain-link converters 34 of the first and second limb portions 28a, 28b, 28c, 30a, 30b, 30c of a given converter limb 14a, 14b, 14c can become unbalanced, e.g. as shown schematically in FIG. 3(b).

Such an imbalance is undesirable because if too little energy is stored within the capacitors 40 of a given chain-link converter 34 then the voltage it is able to generate is reduced, whereas if too much energy is stored in the capacitors 40 of a given chain-link converter 34 then over-voltage problems may arise leading to tripping of the alternate arm converter 12.

There is a need, therefore, for a means of re-establishing a substantially equal balance in the energy stored in respective first and second limb portions of a given converter limb within an alternate arm converter.

According to a first aspect of the invention there is provided an alternate arm converter for use in high voltage DC power transmission and reactive power compensation, the alternate arm converter comprising:

at least one converter limb including first and second DC terminals for connection in use to a DC network and an AC terminal for connection in use to an AC network, the or each converter limb defining first and second limb portions, each limb portion including at least one director switch connected in series with a chain-link converter between a respective one of the first and second DC terminals and the AC terminal, the chain-link converters being operable to generate a voltage waveform at the AC terminal, and the director switches of the first and second limb portions being operable to switch the respective chain-link converters in and out of circuit between the respective DC terminal and the AC terminal; and a controller configured to selectively control the switching of each director switch and thereby switch both limb portions into circuit concurrently during an overlap period of an operation cycle of the alternate arm converter so as to form a current circulation path including each limb portion and the DC network, the controller during formation of the current circulation path forcing an alternating current to flow through the current circulation path to transfer energy between the chain-link converter of one limb portion and the chain-link converter of the other limb portion, whereby at the end of the overlap period the chain-link converter of one limb portion has lost energy and the chain-link converter of the other limb portion has gained energy.

The formation of a current circulation path connects the first and second limb portions in series with one another and in parallel with the DC network, and so allows energy to be transferred from the chain-link converter in one limb portion to the chain-link converter in the other limb portion. The ability to transfer energy in this manner permits a rebalancing of the energy stored in each of the said limb portions of a given converter limb, and so obviates the problems associated with such an imbalance.

Preferably the alternating current forced to flow through the current circulation path has a zero-average waveform shape.

Providing the alternating current flowing through the current circulation path with such a waveform shape helps to ensure that there is no net energy exchange with the DC network. This is desirable because it ensures that the only energy transfer taking place is between the respective limb portions of a given converter limb, and so helps to ensure that rebalancing of the energy stored in the limb portions is achieved in an efficient manner.

Optionally at least one limb portion additionally includes an inductive member and the controller forces the alternating current to flow through the current circulation path by controlling one or both of the chain-link converters to generate a differential voltage across the or each inductive member.

The or each inductive member is able to act as a current control element in order to provide accurate control of the alternating current, i.e. accurate shaping of the alternating current waveform.

In a preferred embodiment of the invention the controller is configured to switch one of the limb portions into circuit at a predetermined activation point in an operating cycle of the alternate arm converter, the controller switches both limb portions into circuit concurrently during an overlap period of the operating cycle, and the overlap period extends either side of the activation point.

Having the overlap period extend either side of the activation point is beneficial because the extent to which a given limb portion must conduct during an opposite half-cycle is shared between the first and second limb portions, and so neither limb portion is burdened with having to support an unduly large maximum voltage.

Optionally the controller is configured to switch the said one limb portion into circuit at a predetermined activation point at or adjacent to a point in the operating cycle at which the voltage waveform at the AC terminal passes through zero.

Having the predetermined activation point at or adjacent to such a point in the operating cycle facilitates the handover of phase current from one converter limb to another, e.g. in a multiple phase alternate arm converter arrangement, as well as allowing some secondary control to be achieved.

Preferably the overlap period is centred about the activation point. Such an arrangement helps to ensure that the extent to which a given limb portion must conduct during an opposite half-cycle is shared equally between the first and second limb portions, and so their respective configurations and voltage ratings may also be essentially the same.

In a further preferred embodiment of the invention the or each director switch in each limb portion is or includes a make-before-break switch.

The inclusion of one or more such director switches in each limb portion readily permits the formation of a current circulation path in which the first and second limb portions are connected in series with one another, and so readily facilitates the aforementioned energy transfer between the first and second limb portions.

During formation of the current circulating path the controller may be configured additionally to circulate a direct current through the current circulation path to transfer energy between at least one of the chain-link converters and the DC network.

The circulation of a direct current (in addition to the aforementioned alternating current) through the current circulation path allows the controller additionally to arrange for the exchange of energy between both the first and second limb portions of a given converter limb with the DC network. The ability to provide such an exchange is advantageous because it allows the controller to correct for a drift in the total, summed voltage across both chain-link converters in a given converter limb from a predetermined reference voltage, i.e. it helps the controller to ensure that the average voltage across each of the energy storage devices, e.g. capacitors, in the chain-link converters of a given converter limb are approximately equal to a reference value.

According to a second aspect of the invention there is provided a method of controlling an alternate arm converter including at least one converter limb having first and second DC terminals for connection in use to a DC network and an AC terminal for connection in use to an AC network, the or each converter limb defining first and second limb portions, each limb portion including at least one director switch connected in series with a chain-link converter between a respective one of the first and second DC terminals and the AC terminal, the chain-link converters being operable to generate a voltage waveform at the AC terminal, and the director switches of the first and second limb portions being operable to switch the respective chain-link converters in and out of circuit between the respective DC terminal and the AC terminal, the method comprising the steps of:

(a) switching both limb portions into circuit concurrently during an overlap period an operation cycle of the alternate arm converter so as to form a current circulation path including each limb portion and the DC network; and (b) during formation of the current circulation path forcing an alternating current to flow through the current circulation path to transfer energy between the chain-link converter of one limb portion and the chain-link converter of the other limb portion, whereby at the end of the overlap period the chain-link converter of one limb portion has lost energy and the chain-link converter of the other limb portion has gained energy.

The method of the invention shares the advantages associated with the corresponding features of the alternate arm converter of the invention.

There now follows a brief description of preferred embodiments of the invention, by way of non-limiting example, with reference to the accompanying figures in which.

Figure 1:
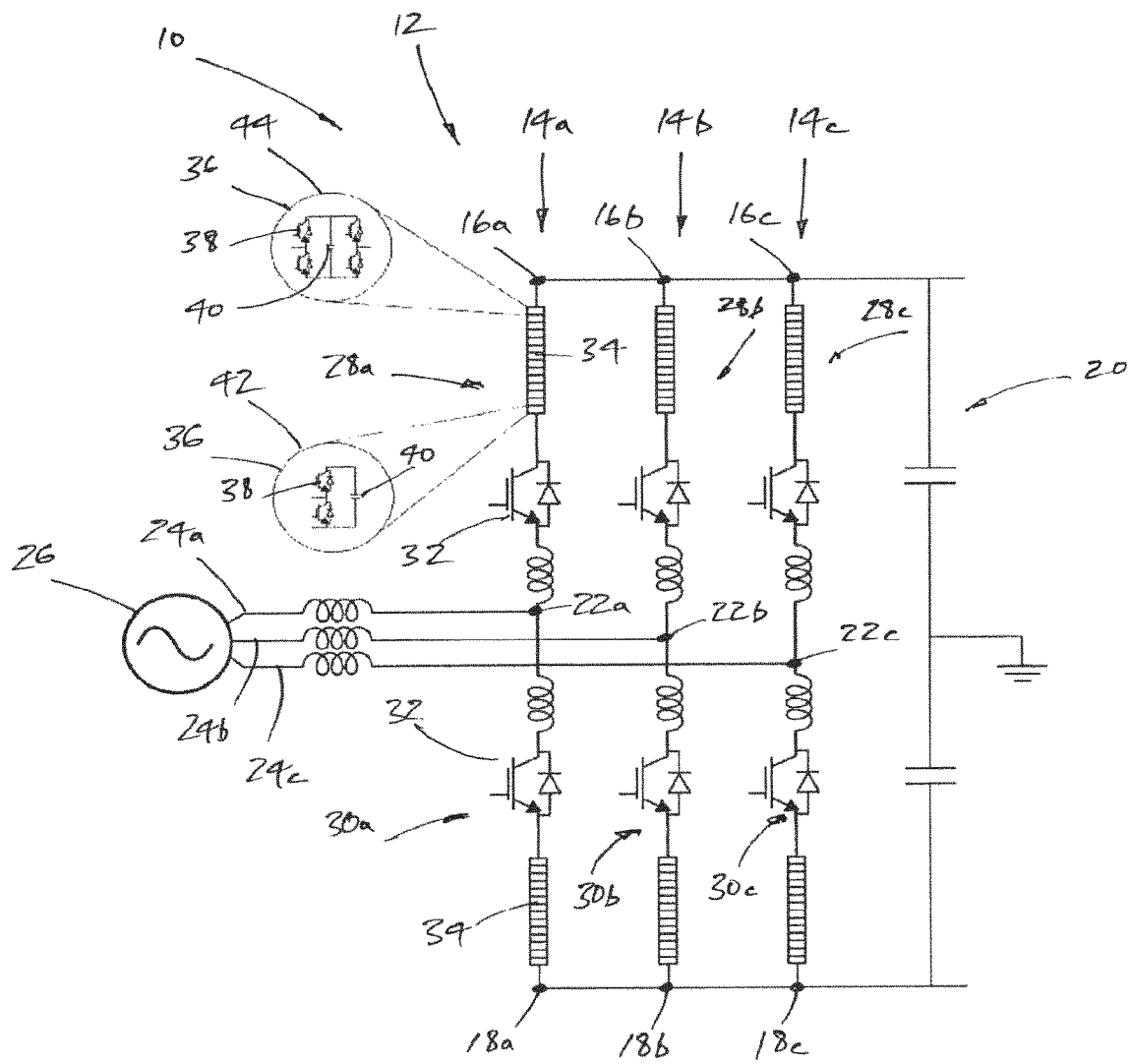
FIG. 1 shows a schematic view of a conventional alternate arm converter.
Figure 2A:
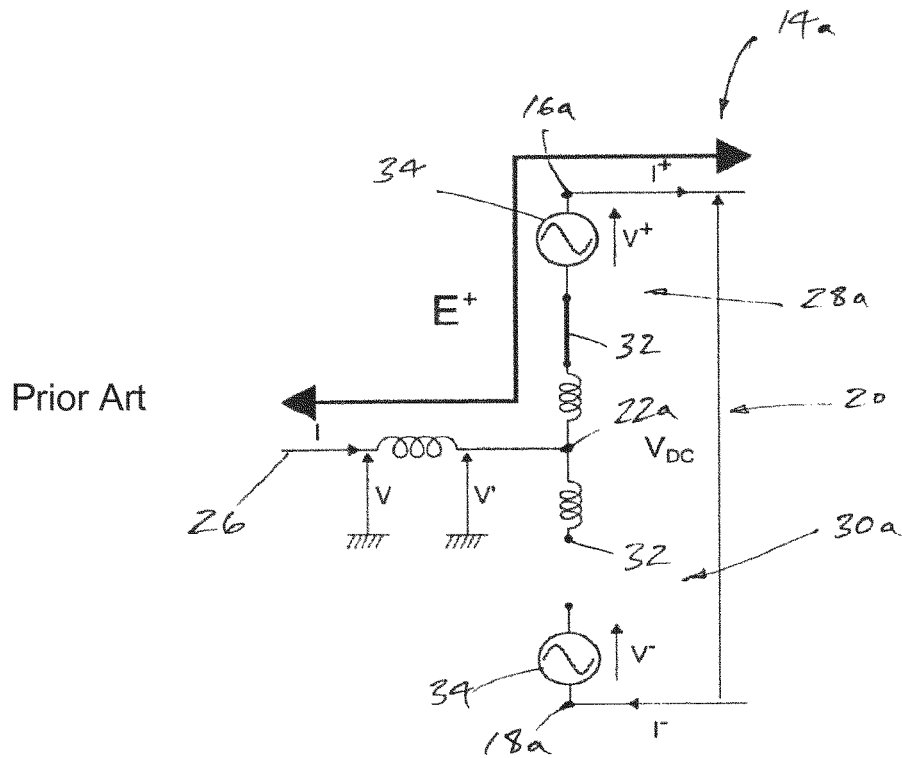
FIG. 2(a) illustrates a first mode of operation of a single converter limb within the alternate arm converter shown in FIG. 1.
Figure 2B:
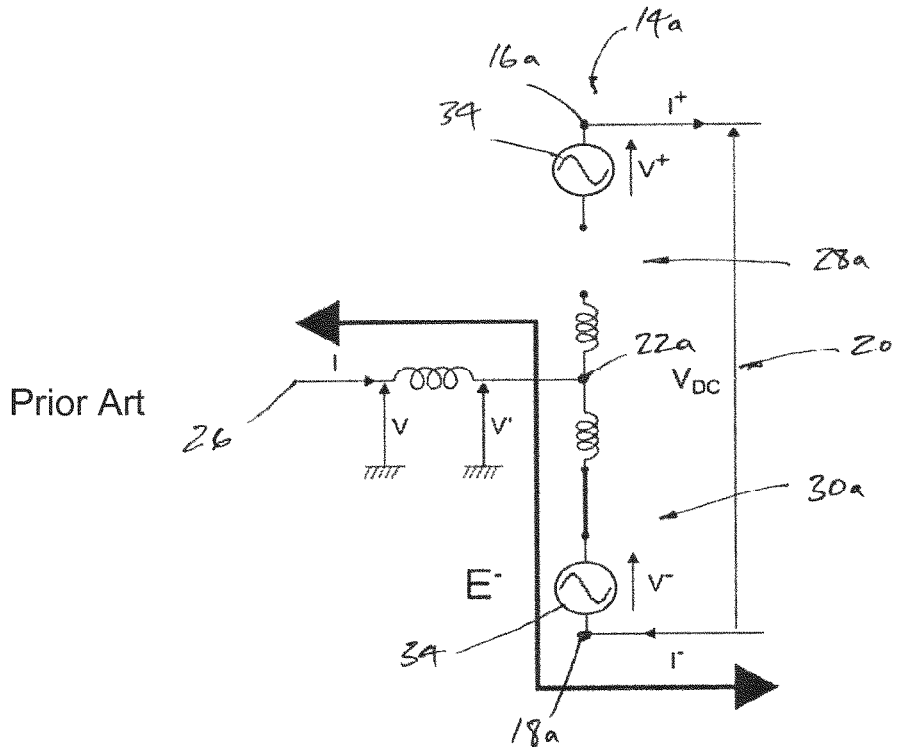
FIG. 2(b) illustrates a second mode of operation of the single converter limb shown in FIG. 2(a)
Figure 3A:
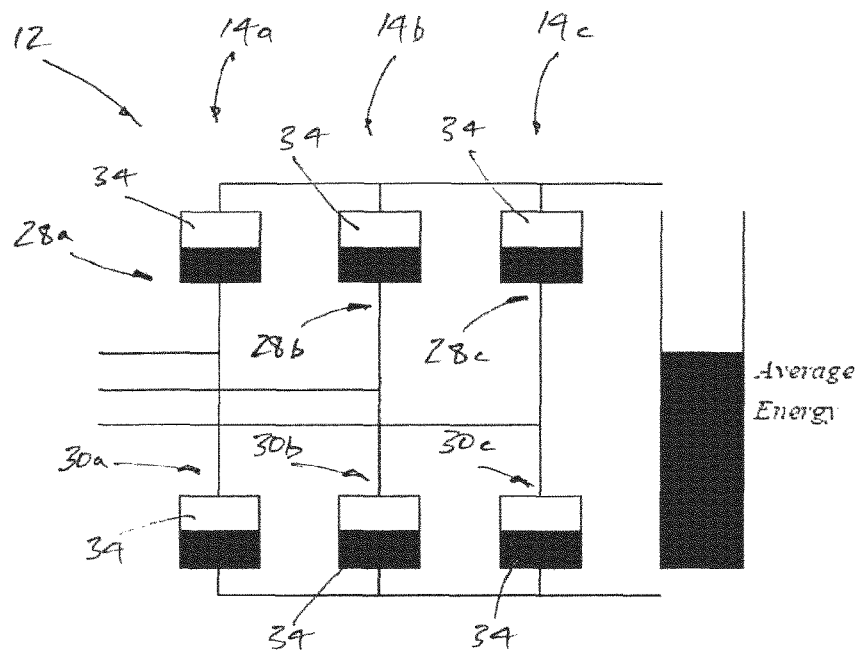
FIG. 3(a) shows a schematic view of the energy balance between respective limb portions of the alternate arm converter shown in FIG. 1 during normal operation.
Figure 3B:
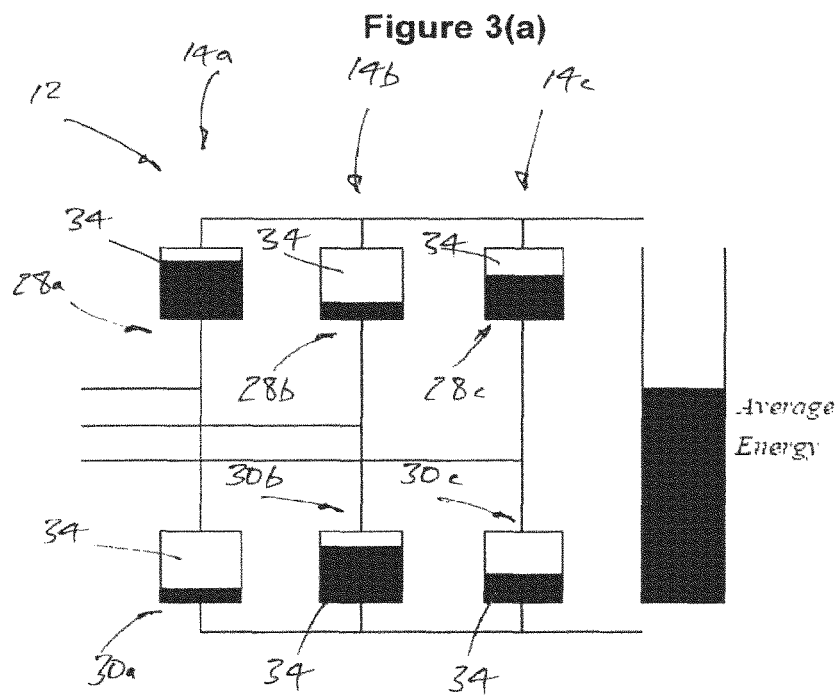
FIG. 3(b) shows a schematic view of the energy imbalance between respective limb portions of the alternate arm converter shown in FIG. 1 following a period of abnormal operation.
Figure 4:
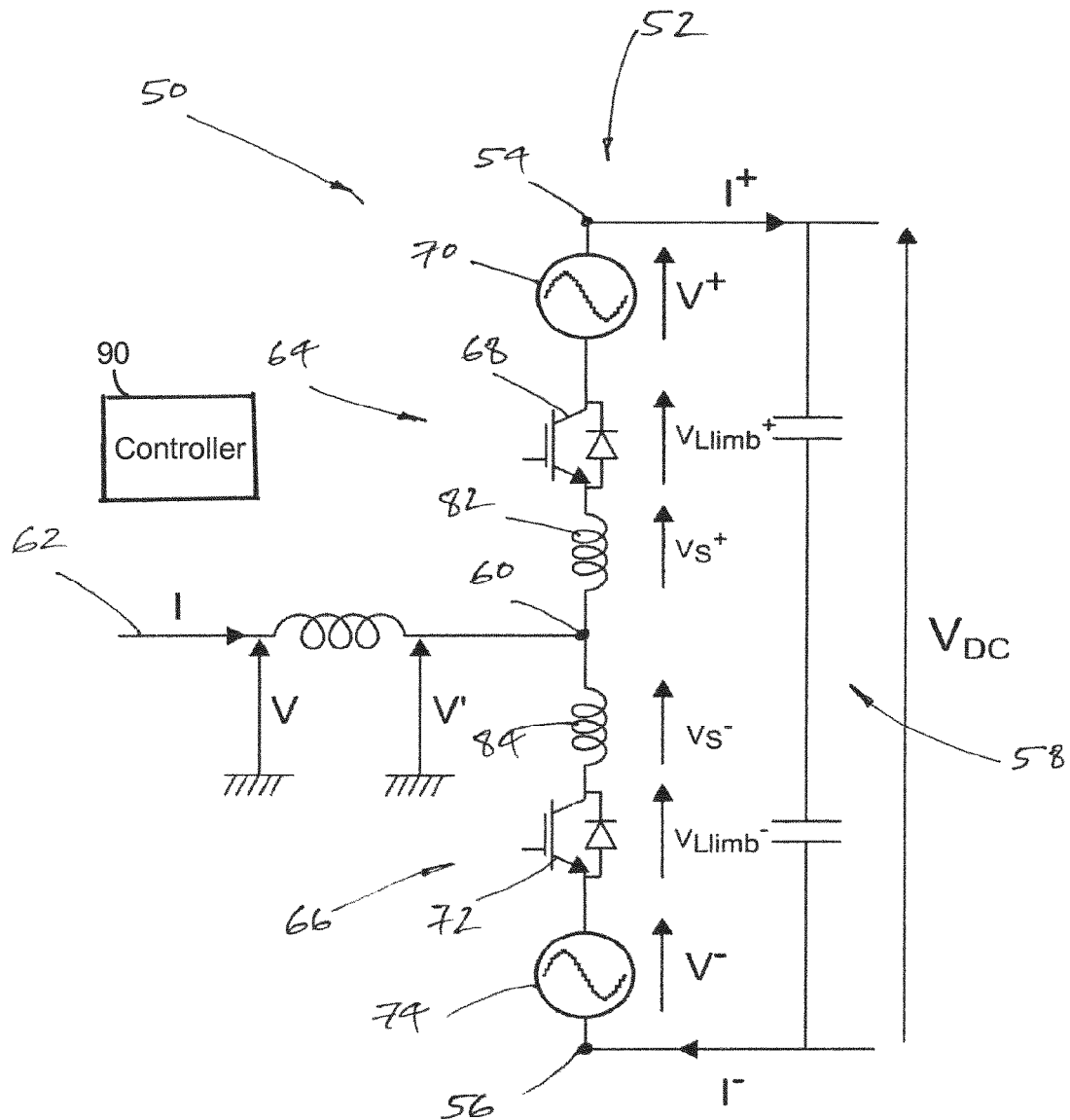
FIG. 4 shows a schematic view of an alternate arm converter according to a first embodiment of the invention.
Figure 6:
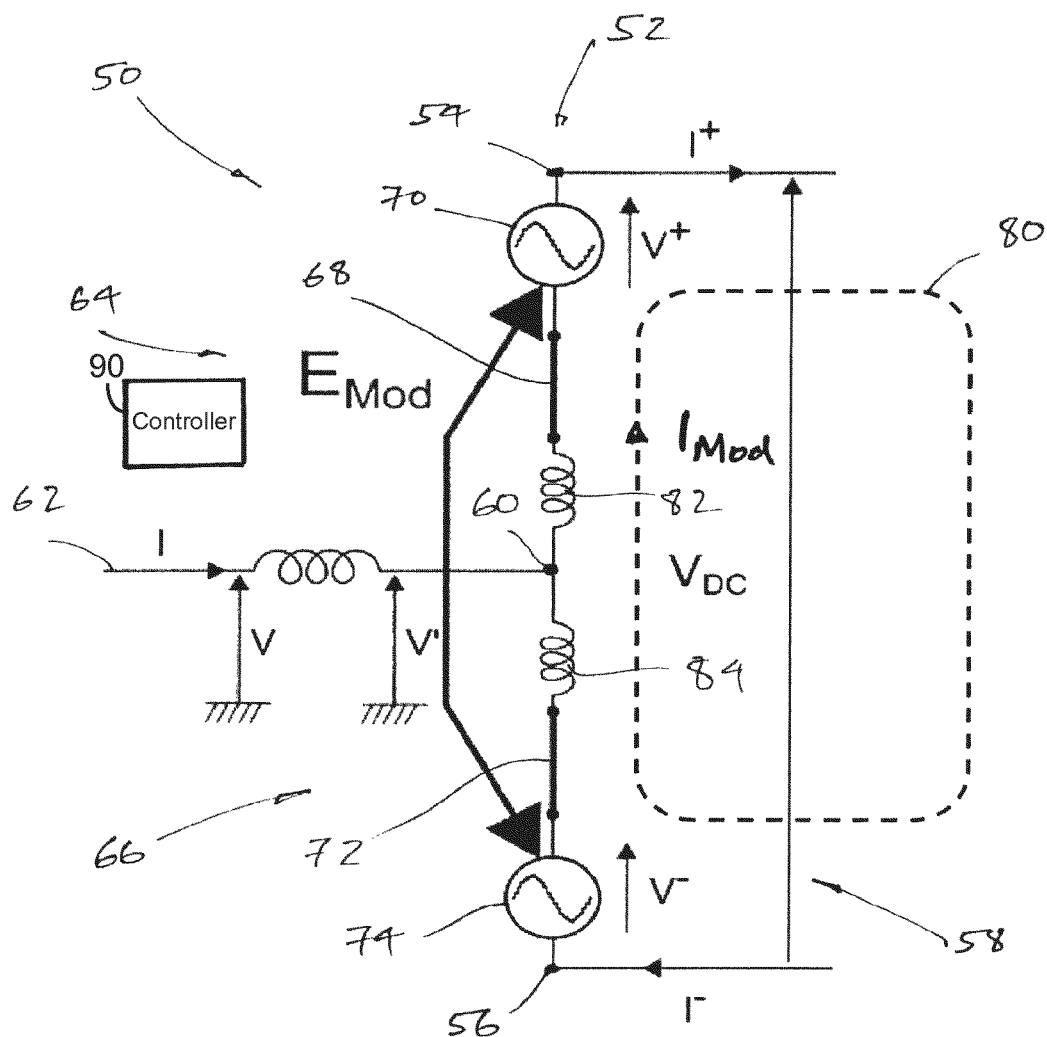
FIG. 6 shows a schematic view of a first aspect of the operation of the alternate arm converter shown in FIG. 4 during formation of a current circulation path.
Figure 8:
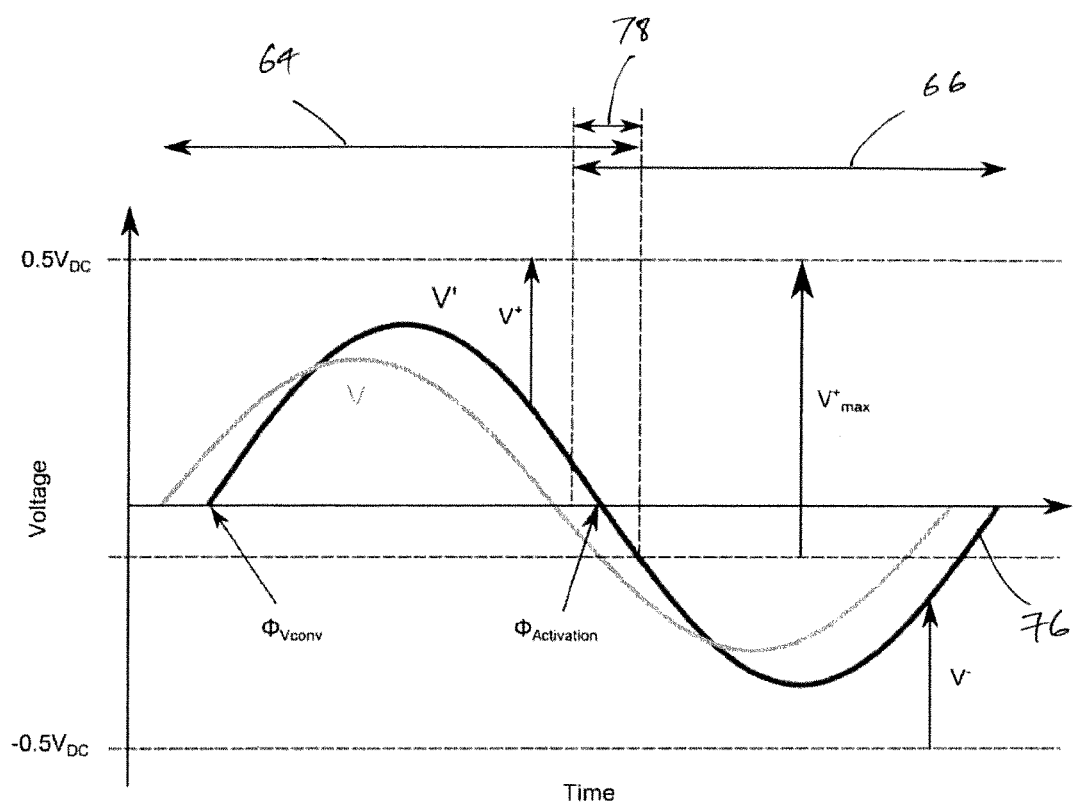
Figure 9:
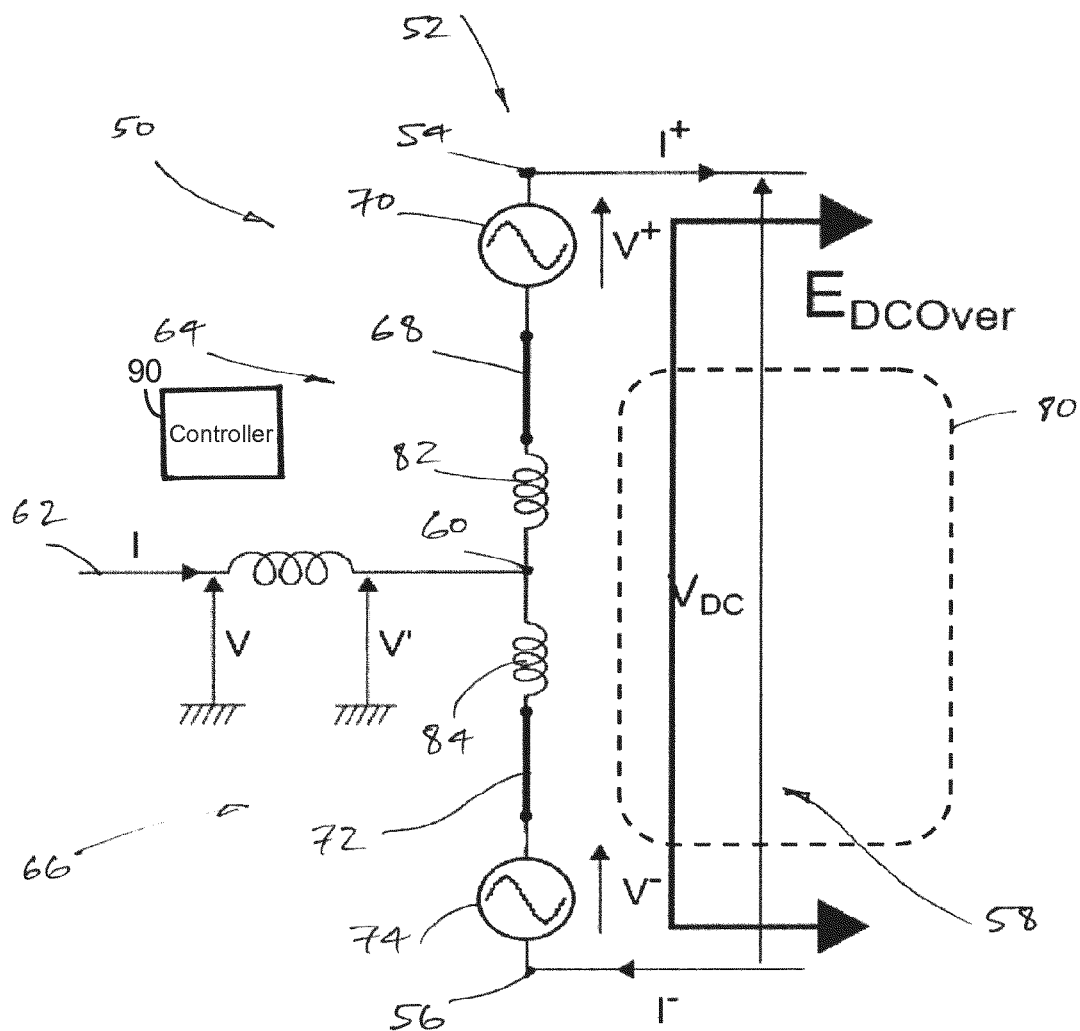
Figure 10:
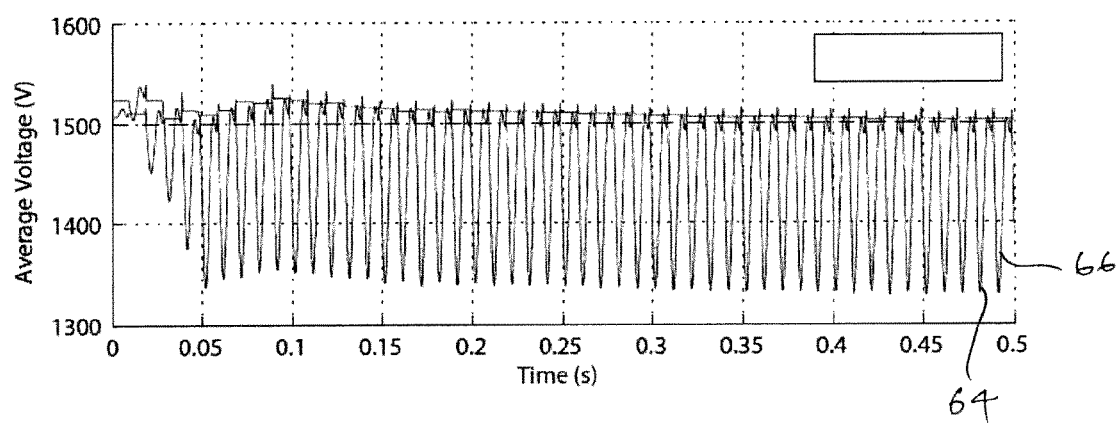

FIGS. 7(a) to 7(d) illustrate the effect of that forcing an alternating current to flow through the current circulation path shown in FIG. 6 has on the energy stored in each limb portion of the alternate arm converter shown in FIG. 4;

FIG. 8 illustrates when during the operating cycle of the alternate arm converter shown in FIG. 4 formation of a current circulation path occurs;

FIG. 9 shows a schematic view of a second aspect of the operation of the alternate arm converter shown in FIG. 4 during formation of a current circulation path; and FIG. 10 illustrates the effectiveness of having a controller (i) force an alternating current to flow through a current circulation path, and (ii) additionally circulate a direct current through the current circulation path.

An alternate arm converter according to a first embodiment of the invention is designated generally by reference numeral 50.

The alternate arm converter 50 includes a converter limb 52 which has first and second DC terminals 54, 56 that in use are connected to a DC network 58, and an AC terminal 60 that in use is connected to an AC network 62. In other embodiments of the invention (not shown) the alternate arm converter 50 may include more than one converter limb, and in particular may include three converter limbs, each of which is associated with a given phase of a corresponding AC network.

The converter limb 52 defines first and second limb portions 64, 66. The first limb portion 64 includes a first director switch 68 which is connected in series with a first chain-link converter 70 between the first DC terminal 54 and the AC terminal 60, while the second limb portion 66 includes a second director switch 72 that is connected in series with a second chain-link converter 74.

Each of the first and second chain-link converters 70, 74 is made up of a plurality of modules (not shown), each of which includes various switching elements arranged in parallel with an energy storage device so as to provide a switchable voltage source. As such each chain-link converter 70, 74 is able to generate a voltage waveform at the AC terminal 60.

Each of the first and second director switches 68, 72 includes a make-before-break switch that is operable to switch the corresponding first or second chain-link converter 70, 74 in and out of circuit between the respective DC terminal 54, 56 and the AC terminal 60.

The alternate arm converter 50 also includes a controller 90 which is configured to selectively control the switching of the first and second director switches 68, 72 during an operating cycle 76 of the converter 50.

Figure 5:
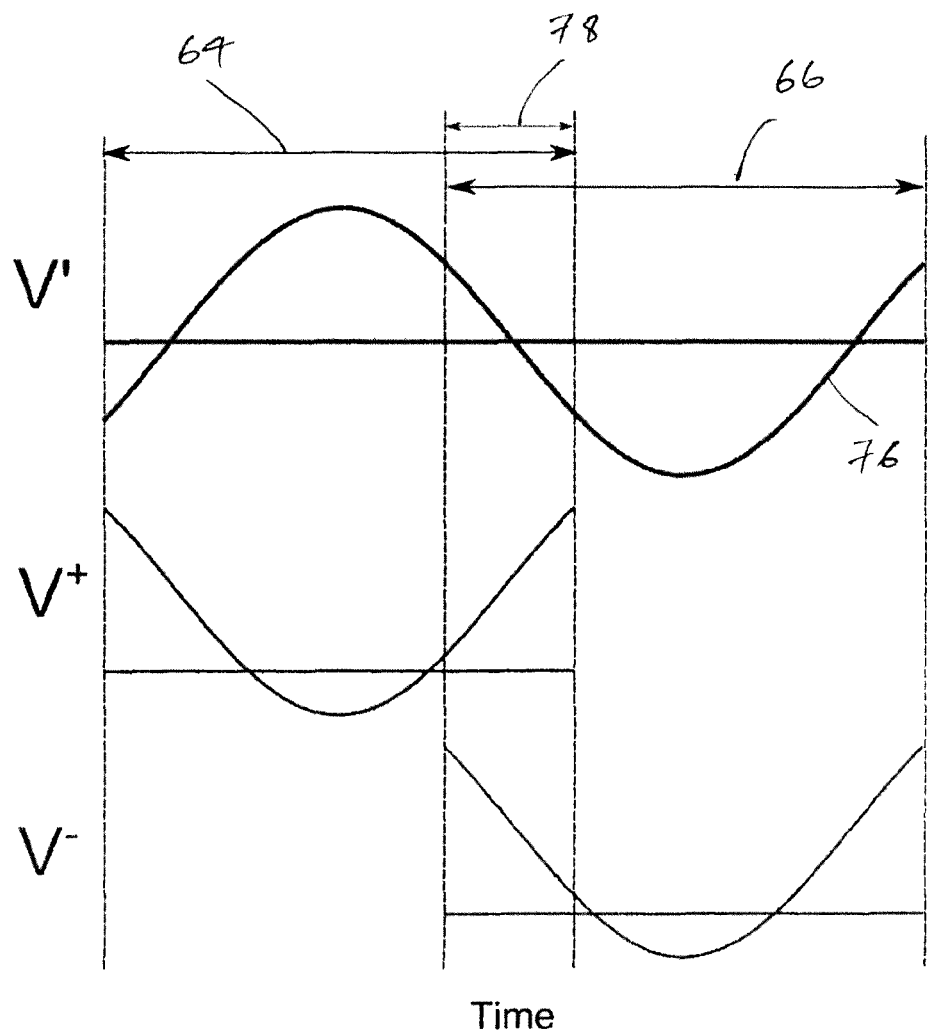
FIG. 5 illustrates the voltages generated in each limb portion of the alternate arm converter shown in FIG. 4 during an operating cycle.

In use the controller 90 switches the director switches 68, 72 so as to allow an alternating current to flow through one or other of the first and second limb portions 64, 66. During such operation of the alternate arm converter 50 the chain-link converter 70, 74 in a given limb portion 64, 66, in which alternating current is selectively allowed to flow, generates a voltage $V^+$, $V^-$ which gives rise to a converter voltage V' at the AC terminal 60, i.e. as shown in FIG. 5.

The controller 90 is configured to switch both limb portions 64, 66 concurrently into circuit, during an overlap period 78 of the operating cycle 76, so as to form a current circulation path 80 which includes each limb portion 64, 66 and the DC network 58, as shown schematically in FIG. 6.

During formation of the current circulation path 80, i.e. during the overlap period 78, the controller 90 forces an alternating current $I_{mod}$ to flow through the current circulation path 80.

More particularly the controller 90 forces an alternating current $I_{mod}$ with a zero-average waveform shape, i.e. a waveform shape which is symmetrical about a zero current axis, to flow through the current circulation path 80.

Figure 7:
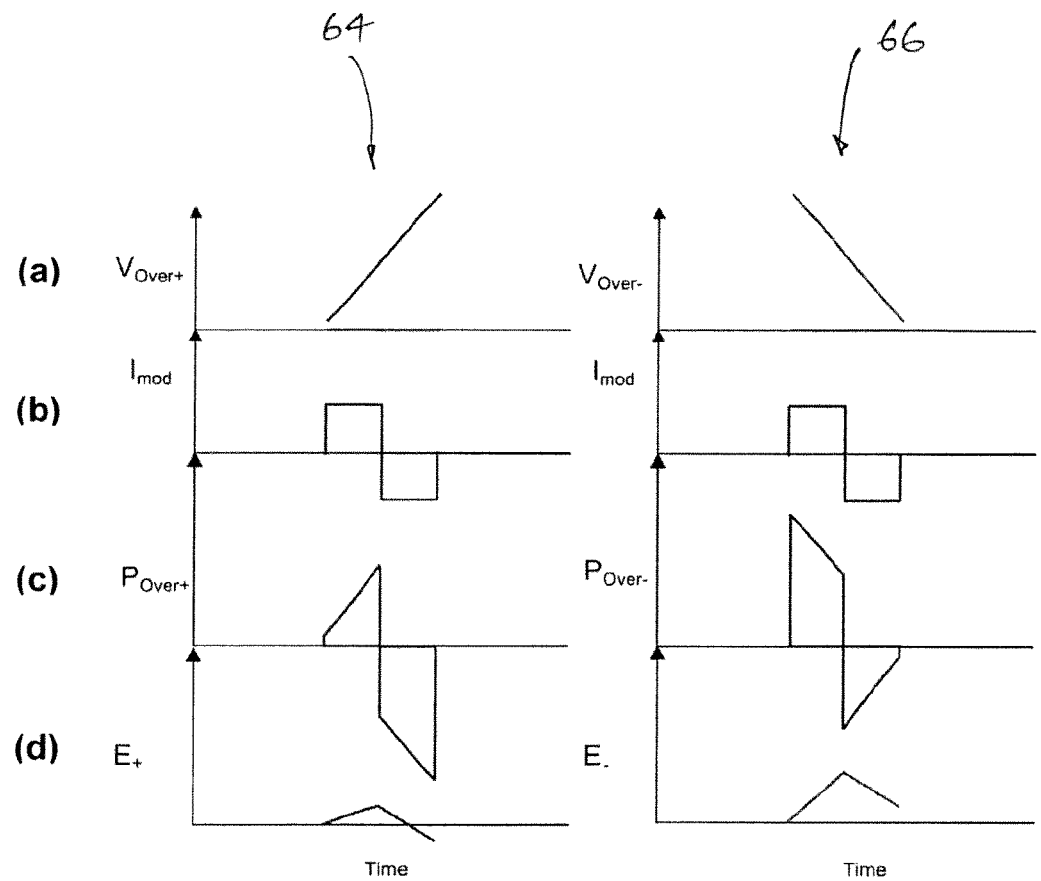

A preferred alternating current $I_{mod}$ waveform shape is a square wave, as shown in FIG. 7(b). In other embodiments of the invention, however, the zero-average waveform shape may be sinusoidal, saw-tooth, or trapezoidal.

The controller 90 forces such an alternating current $I_{mod}$ to flow by controlling each of the first and second chain-link converters 70, 74 to generate a differential voltage $Vs^+$, $Vs^-$ across a corresponding first or second inductive member 82, 84, e.g. a first or second inductor, with which the chain-link converter 70, 74 is additionally connected in series within a corresponding first or second limb portion 64, 66, as shown schematically in FIG. 4.

In other embodiments of the invention the controller 90 may force such a current to flow by controlling only one of the first or second chain-link converters 70, 74 to generate a differential voltage across only one corresponding inductive member.

The square wave alternating current $I_{mod}$ (as shown in FIG. 7(b)) combines with the voltage $V_{Over+}$, $V_{Over-}$ generated within each limb portion 64, 66 during the overlap period 78 (as shown in FIG. 7(a)) to modify the power $P_{Over+}$, $P_{Over-}$ generated in each limb portion 64, 66 (as shown in FIG. 7(c)) and, in turn, affect the energy stored $E^+$, $E^-$ in the chain-link converter 70, 74 of each limb portion 64, 66 (as shown in FIG. 7(d)).

The alternating current $I_{mod}$ forced to flow through the current circulation path 80 has an equal but opposite effect on the power $P_{Over+}$, $P_{Over-}$ generated in each limb portion 64, 66, as shown in FIG. 7(c).

In addition, as shown clearly in FIG. 7(d), less energy $E^+$ is stored in the first limb portion 64 at the end of the overlap period 78 than was stored at the beginning of the overlap period 78 and, commensurately, more energy $E^-$ is stored in the second limb portion 66 at the end of the overlap period 78 than was stored at the beginning of the overlap period 78.

In the foregoing manner having the controller 90 force the alternating current $I_{mod}$ to flow through each of the first and second limb portions 64, 66 during the overlap period 78 (i.e. during formation of a current circulation path 80 between the first and second limb portions 64, 66) causes a transfer of energy $E_{Mod}$ between the chain-link converters 70, 74 of the first and second limb portions 64, 66, as illustrated schematically in FIG. 6.

in the embodiment shown the controller 90 is configured to switch one of the limb portions, 64, 66, e.g. the second limb portion 66, into circuit at a predetermined activation point $\phi_{Activation}$ within the operating cycle 76 of the alternate arm converter 50.

In the embodiment shown the activation point $\phi_{Activation}$, i.e. the angle within the operating cycle 76, is selected to coincide with a point in the operating cycle 76 at which the voltage at the AC terminal 60 passes through zero, as shown in FIG. 8. However, in other embodiments of the invention the activation point $\phi_{Activation}$ may be adjacent to the point in the operating cycle 76 at which the voltage at the AC terminal 60 passes through zero.

Selection of the activation point $\phi_{Activation}$ is influenced by a consideration of the amount of voltage it is desired to have each limb portion 64, 66 subtract from the DC voltage $V_{DC}$ in order to achieve a desired converter voltage, i.e. a desired voltage V' at the AC terminal 60. A further consideration may be the extent to which it is desired to influence how energy is stored within each chain-link converter 70, 74 by an alternating current which can flow either through the various energy storage devices or the associated switching elements.

As shown in FIG. 8, the overlap period 78 extends either side of the activation point $\phi_{Activation}$ and, more particularly, the overlap period 78 is centred about the activation point $\phi_{Activation}$.

The duration of the overlap period 78, i.e. the length of time for which both limb portions 64, 66 are connected in series with one another within the current circulation path 80, is chosen according to how far into the opposite half-cycle of the operating cycle 76 it is desired to have each limb portion 64, 66 switched into circuit on its own, and hence according to a consideration of the maximum voltage each limb portion 64, 66 must support during such sole operation.

A further factor in establishing the duration of the overlap period 78 is the magnitude of alternating current $I_{mod}$ forced to flow through the current circulation path 80 it is desired to generate during the overlap period to effect the aforementioned energy transfer between limb portions 64, 66.

The overlap period 78 can last up to 60 electrical degrees of a 360 electrical degree operating cycle 76, but is typically less than 15 electrical degrees.

The controller 90 may, optionally, establish a further parameter within the operating cycle 76, namely a reference point $\phi_{Vconv}$ at which the converter voltage, i.e. the voltage V' at the AC terminal 60, crosses zero on a further occasion. Such a reference point $\phi_{Vconv}$ is helpful in synchronising operation of the various components within each limb portion 64, 66, as well as operation of the limb portions 64, 66 themselves.

In addition to the foregoing, the controller 90 during formation of the current circulation path 80 is also configured to circulate a direct current through the current circulation path to transfer energy $E_{DCOver}$ between one or both of the chain-link converters 70, 74 and the DC network, i.e. as shown schematically in FIG. 9, in order to correct any drift from a predetermined reference voltage in the total voltage across all the energy storage devices, i.e. capacitors, in the converter limb 52.

FIG. 10 illustrates the effectiveness of having the controller 90 force the alternating current $I_{mod}$ to flow through the current circulation path 80 to transfer energy from one limb portion to another, and thereby achieve a substantially equal balance in the energy stored (i.e. voltage level) within in each energy storage device in the first limb portion 64 and the energy stored within those of the second limb portion 66.

FIG. 10 also illustrates the effectiveness of having the controller 90 additionally circulate a direct current through the current circulation path 80 to transfer energy between the limb portions 64, 66 and the DC network 58, and thereby reduce the extent to which the total voltage across all the energy storage devices in each of the first and second limb portions 64, 66 (as expressed as an average voltage across each energy storage device within a given limb portion 64, 66) drifts or deviates from a desired reference value, e.g. 1500V.

The invention claimed is:

1. An alternate arm converter for use in high voltage DC power transmission and reactive power compensation, the alternate arm converter comprising:
   at least one converter limb including first and second DC terminals for connection in use to a DC network and an AC terminal for connection in use to an AC network, the or each converter limb defining first and second limb portions, each limb portion including at least one director switch connected in series with a chain-link converter between a respective one of the first and second DC terminals and the AC terminal, the chain-link converters being operable to generate a voltage waveform at the AC terminal, and the director switches of the first and second limb portions being operable to switch the respective chain-link converters in and out of circuit between the respective DC terminal and the AC terminal; and
   a controller programmed to selectively control the switching of each director switch and thereby switch both limb portions into circuit concurrently during an overlap period of an operation cycle of the alternate arm converter so as to form a current circulation path including each limb portion and the DC network, the controller during formation of the current circulation path being further programmed to force an alternating current to flow through the current circulation path so that energy is transferred between the chain-link converter of one limb portion and the chain-link converter of the other limb portion, and at the end of the overlap period the chain-link converter of one limb portion has lost energy and the chain-link converter of the other limb portion has gained energy.

2. The alternate arm converter according to claim 1 wherein the alternating current forced to flow through the current circulation path has a zero-average waveform shape.

3. The alternate arm converter according to claim 1 wherein at least one limb portion additionally includes an inductive member and the controller forces the alternating current to flow through the current circulation path by controlling one or both of the chain-link converters to generate a differential voltage across the or each inductive member.

4. The alternate arm converter according to claim 1 wherein the or each director switch in each limb portion is or includes a make-before-break switch.

5. The alternate arm converter according to claim 1 wherein during formation of the current circulating path the controller is configured additionally to circulate a direct current through the current circulation path to transfer energy between at least one of the chain-link converters and the DC network.

6. The alternate arm converter according to claim 1 wherein the controller is configured to switch one of the limb portions into circuit at a predetermined activation point in the operating cycle of the alternate arm converter, the controller switches both limb portions into circuit concurrently during the overlap period of the operating cycle, and the overlap period extends either side of the predetermined activation point.

7. The alternate arm converter according to claim 6 wherein the controller is configured to switch the said one limb portion into circuit at a the predetermined activation point at or adjacent to a point in the operating cycle at which the voltage waveform at the AC terminal passes through zero.

8. The alternate arm converter according to claim 6 wherein the overlap period is centered about the activation point.

9. A method of controlling an alternate arm converter including at least one converter limb having first and second DC terminals for connection in use to a DC network and an AC terminal for connection in use to an AC network, the or each converter limb defining first and second limb portions, each limb portion including at least one director switch connected in series with a chain-link converter between a respective one of the first and second DC terminals and the AC terminal, the chain-link converters being operable to generate a voltage waveform at the AC terminal, and the director switches of the first and second limb portions being operable to switch the respective chain-link converters in and out of circuit between the respective DC terminal and the AC terminal, the method comprising the steps of:
 (a) switching both limb portions into circuit concurrently during an overlap period of an operation cycle of the alternate arm converter so as to form a current circulation path including each limb portion and the DC network; and
 (b) during formation of the current circulation path forcing an alternating current to flow through the current circulation path so that energy is transferred between the chain-link converter of one limb portion and the chain-link converter of the other limb portion, and at the end of the overlap period the chain-link converter of one limb portion has lost energy and the chain-link converter of the other limb portion has gained energy.

* * * * *